United States Patent
Harmer

(10) Patent No.: US 8,082,436 B2
(45) Date of Patent: Dec. 20, 2011

(54) ENHANCED UEFI FRAMEWORK LAYER

(75) Inventor: Tracy Harmer, Taylor, TX (US)

(73) Assignee: Dell Products L.P., Round Rock, TX (US)

( * ) Notice: Subject to any disclaimer, the term of this patent is extended or adjusted under 35 U.S.C. 154(b) by 801 days.

(21) Appl. No.: 12/169,365

(22) Filed: Jul. 8, 2008

(65) Prior Publication Data

US 2010/0011197 A1   Jan. 14, 2010

(51) Int. Cl.
*G06F 15/177* (2006.01)

(52) U.S. Cl. .................. 713/2; 713/1; 713/100

(58) Field of Classification Search .......... None
See application file for complete search history.

(56) References Cited

U.S. PATENT DOCUMENTS

| | | | |
|---|---|---|---|
| 7,698,547 B1* | 4/2010 | Polyudov | 713/2 |
| 2003/0115443 A1* | 6/2003 | Cepulis et al. | 713/2 |
| 2004/0034764 A1* | 2/2004 | Bulusu et al. | 713/1 |
| 2006/0116208 A1* | 6/2006 | Chen et al. | 463/43 |

OTHER PUBLICATIONS

Extensible Firmware Interface—Wikipedia, the free encyclopedia; Extensible Firmware Interface; Jun. 23, 2008; pp. 1-8; Wikipedia; Wikimedia Foundation, Inc.; http://en.wikipedia.org/wiki/Extensible_Firmware_Interface.

* cited by examiner

*Primary Examiner* — Dennis M Butler
(74) *Attorney, Agent, or Firm* — Haynes and Boone, LLP

(57) ABSTRACT

A unified extensible firmware interface (UEFI) includes providing by a manufacturer, a basic input/output system (BIOS) personality module to initialize an information handling system (IHS) and receiving from an outside vendor, a BIOS initialization module to initialize the IHS. The UEFI also includes integrating operations of the personality module and the initialization module by translating communication between the personality module and the initialization module.

15 Claims, 2 Drawing Sheets

ENHANCED UEFI FRAMEWORK LAYER

BACKGROUND

The present disclosure relates generally to information handling systems, and more particularly to an enhanced unified extensible firmware interface (UEFI) framework layer that can be integrated into an independent basic input/output system (BIOS) vendor's (IBV's) BIOS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

To add new functionality, IHS manufacturers may develop new Uniform Extensible Firmware Interface (UEFI) based basic input/output system (BIOS) for both desktop and Portable devices. In order to support the functionality and capabilities that the manufacturer has had in its prior BIOS offerings, changes are required to the UEFI framework. These changes may provide enhancements to the UEFI framework. The other parts of the UEFI BIOS, Pre-memory/pre-EFI Initialization (e.g., PEI) Drivers, Driver execution Environment (e.g., DXE) Drivers & System Management Mode (SMM) BIOS code, may then use this enhanced set of framework interfaces (e.g., protocols) to access the IHS. This does not cause a problem as long as the code that is being developed is only going to be used internal to the IHS manufacturer's BIOS and hence have access to the new framework interfaces.

For ease of interchangeability of systems and to support manufacturability by different vendors, it is desirable that the IHS manufacturer provide some of the internally developed PEI, DXE and SMM functionality and that those code objects could then be plugged into Original Design Manufacturer (ODM) UEFI BIOSs or Independent BIOS Vendor (IBV) BIOSs to maintain the IHS manufacturer's BIOS behavior even when the BIOS being used is an ODM or IBV product that is not the IHS manufacturer's internally developed UEFI BIOS. This poses a problem, because the IHS manufacturer PEI, DXE and SMM functionality is dependent on the framework changes that were made in the IHS manufacturer's internally developed UEFI BIOS to provide additional capabilities. As such, these modules are presented as being personality modules that could be plugged in at will to another vendor's UEFI BIOS.

However, using these personality modules poses a problem because the IHS manufacturer's UEFI personality modules are not traditionally designed provided to plug into an ODM's or IBV's UEFI BIOS with the standard UEFI Framework interfaces. In other words, personality modules are provided to use the IHS manufacturer's enhanced UEFI Framework interfaces and are not provided to be pluggable into a UEFI BIOS that is using the standard UEFI Framework interfaces. Without another solution, the IHS manufacturer may thus be required to provide its BIOS source code to ODMs or IBV BIOS providers in order for the IHS manufacturer's personality modules to work with these outside systems.

Accordingly, it would be desirable to provide an improved unified extensible firmware interface framework layer absent the disadvantages discussed above.

SUMMARY

According to one embodiment, a unified extensible firmware interface (UEFI) includes providing by a manufacturer, a basic input/output system (BIOS) personality module to initialize an information handling system (IHS) and receiving from an outside vendor, a BIOS initialization module to initialize the IHS. The UEFI also includes integrating operations of the personality module and the initialization module by translating communication between the personality module and the initialization module.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
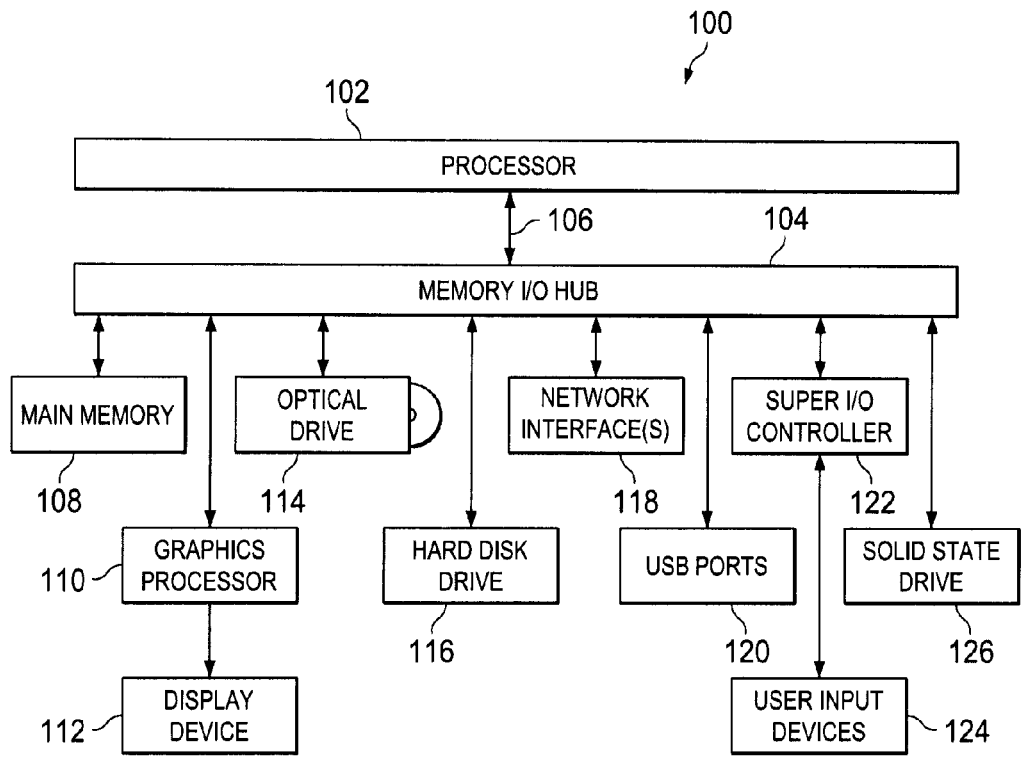
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
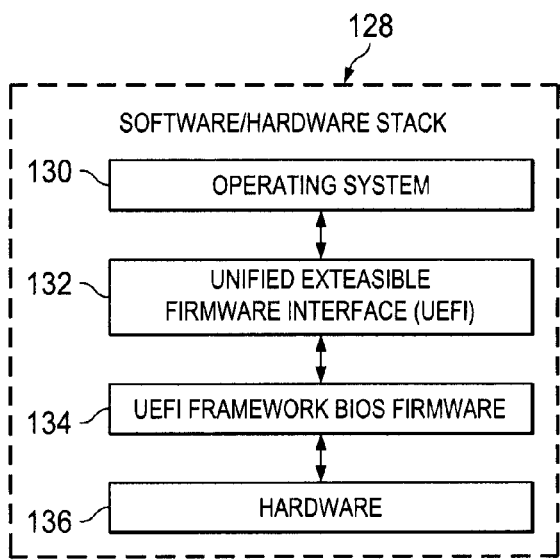
FIG. 2 illustrates an embodiment of a software/hardware stack for the IHS of FIG. 1.

FIG. 2 illustrates an embodiment of a software/hardware stack 128 for an IHS 100. The software/hardware stack 128 includes an operating system 130, an unified extensible firmware interface (UEFI) 132, UEFI framework BIOS firmware 134 and hardware 136. The operating system 130 is a software program code that is responsible for the management and coordination of activities and the sharing of the resources of the IHS 100. The operating system 130 acts as a host for application programs that are run on the IHS 100. The operating system 130 also handles the details of the operation of the hardware 136. The UEFI 132 is a specification that defines a software 130 interface between the operating system 130 and the platform firmware 134. The firmware 134 is a computer program that is embedded in a hardware 136 device. Firmware is generally understood as something between hardware 136 and software. Like software, firmware 134 is a computer program that is executed by a processor 102. However, firmware 134 is also linked to hardware 136, and has little meaning outside of the hardware 136. In an embodiment, the firmware 134 is the framework based BIOS code that executes and sets up the system prior to UEFI 132 setting up the interface for loading the operating system. The hardware 136 is the physical components of the IHS 100, such as, the processor 102, the memory I/O hub 104, the memory 108, and a variety of other components of the IHS 100. Portions of the hardware 136 may be referred to as the chipset for the IHS 100.

Figure 3:
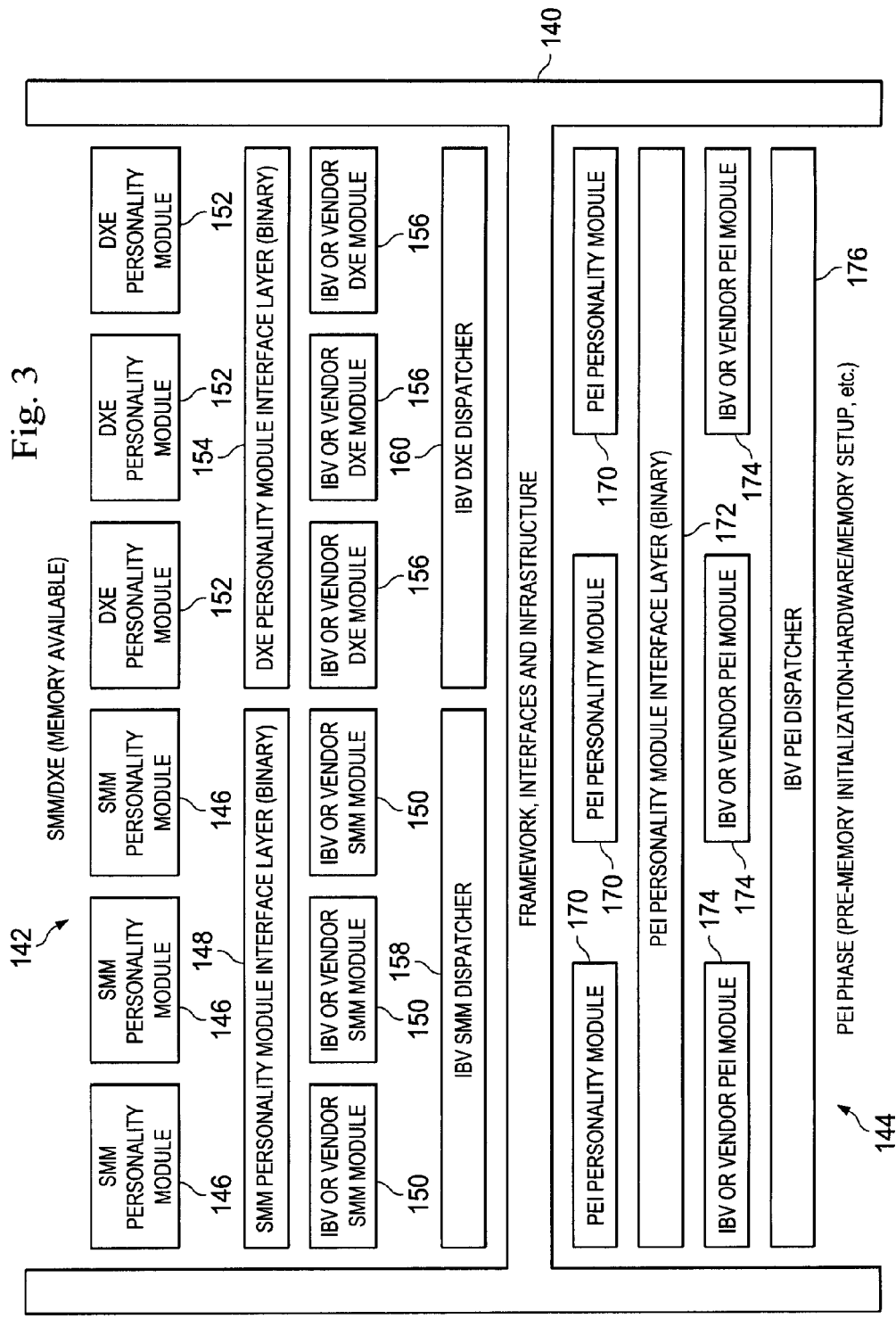
FIG. 3 illustrates a block diagram of an embodiment of a UEFI personality module layer diagram.

FIG. 3 illustrates a block diagram of an embodiment of a UEFI personality module layer diagram 138. The layer diagram includes a BIOS framework 140, including interfaces and infrastructure. It should be readily understood by a person having ordinary skill in the art that the BIOS framework 140 has an SMM/DXE phase 142 and an PEI phase 144. The PEI phase 142 is generally considered a pre-memory (e.g., main memory 108) initialization and the SMM/DXE phase 142 is generally considered post-memory (e.g., main memory 108) initialization.

As should be readily understood, the SMM (system management mode)/DXE (driver execution environment) phase 142 is known in the art as the initialization of the IHS 100 where most of the system initialization takes place. Generally, the PEI (pre-EFI (UEFI) initialization) phase 144 initializes permanent memory (e.g., main memory 108) in the platform so that the DXE phase 142 may be loaded and executed. In an embodiment, the PEI phase 144 provides a standardized system for specific initial configuration routines for the processor 102, and other components such as, the chipset and system board. The PEI phase 144 initializes enough of the system to allow instantiation of the DXE phase 142. In an embodiment, the DXE phase 142 may include a DXE foundation (not shown), a DXE dispatcher 156, and DXE drivers (not shown). A DXE foundation generally produces a set of boot services, runtime services and DXE services. The DXE dispatcher 156 generally discovers and executes DXE drivers in the proper order. The DXE drivers are also generally responsible for initializing the processor 102, chipset (e.g., the memory I/O hub 104 and a variety of other components), platform components and software abstractions. The result of the DXE is generally a fully formed EFI/UEFI interface. In an embodiment, the SMM portion of the SMM/DXE phase 142 operates substantially the same as the DXE portion.

In an SMM portion of the SMM/DXE phase 142, the phase 142 includes any number of SMM personality modules 146, an SMM personality module interface layer 148, any number of independent BIOS vendor (IBV) or vendor SMM modules 150 and an IBV or vendor SMM dispatcher 158. In a DXE portion of the SMM/DXE phase 142, the phase 142 includes any number of DXE personality modules 152, a DXE personality module interface layer 154, any number of IBV or vendor DXE modules 156 and an IBV or vendor DXE dispatcher 160.

The PEI phase 144 includes any number of PEI personality modules 170, a PEI personality module interface layer 172, any number of IBV or vendor PEI modules 174 and a IBV or vendor PEI dispatcher 176.

FIG. 3 discloses a system to allow an IHS manufacturer's UEFI modules 146, 152 and/or 170 to be able to plug into other vendors BIOS systems. Thus, the present disclosure provides an IHS manufacturer's personality modules 146, 152 and/or 170 without loosing the uniqueness (e.g., BIOS setup, initialization, and a variety of other functions). Traditional BIOS frameworks may be changed to get the functionality and behavior of the BIOS to provide the unique features or "feel" specific to a particular IHS manufacturer.

In an embodiment, the system creates one or more personality module interface layers 148, 154, and/or 172 that the IHS manufacturer provides along with any personality modules 146, 152, and/or 170 in order to allow the IHS manufacturer's personality modules 146, 152, and/or 170 to run. The personality module interface layers 148, 154, and/or 172 acts as a translator between the personality modules 146, 152 and/or 170 and the standard Framework interfaces 140 along with interfaces from other standard drivers 150, 156 and/or 174 as needed. Thus, the personality module interface layer 148, 154 and/or 172 may be used rather than changing the personality modules 146, 152 and/or 170 and possibly loosing functionality or capabilities. Additionally, the personality module interface layer 148, 154 and/or 172 may be used rather than providing the IHS manufacturer's enhanced UEFI Framework to other BIOS vendors to use in their BIOSs. In an embodiment, the IHS manufacturer may provide the personality module interface layer 148, 154 and/or 172 as a binary driver executable file to the generic BIOS vendors, rather than providing the source code to the generic BIOS vendors. Using the UEFI environment allows having the framework differences in a translator such as, the personality module interface layer 148, 154 and/or 172, and not in the framework 140 itself.

In an embodiment, the personality module interface layer 148, 154 and/or 172 consumes as many standard UEFI protocols as necessary from a IBV BIOS. These interfaces and dependencies may be documented thoroughly to define to the IBV and ODM vendors the set of standard UEFI interfaces and protocols that may be required in order to be compatible with the personality modules 146, 152 and/or 170 and their respective interface layers 148, 154 and/or 172.

The personality module interface layers 148, 154 and/or 172 provide enhancements and changes along with any special functionality and protocols that the IHS manufacturer personality modules 146, 152 and/or 170 are dependant on. In other words, The personality module layer may incorporate the IHS manufacturer's uniqueness and functionality associated with the UEFI Framework 140. Because these personality module interface layers 148, 154 and/or 172 may be provided as code objects that could then be linked into other IBV or ODM BIOSs, an IHS manufacturer does not risk loosing its unique code.

A feature of the present disclosure is that IBV and ODM BIOS providers (e.g., generic BIOS providers) would have very few, if any, changes to make to their BIOS systems, except for supporting the required standard UEFI Framework Interfaces. The ODM or IBV may then merge their UEFI BIOS with the IHS manufacturer personality module interface layers 148, 154 and/or 172 along with the personality modules 146, 152 and/or 170 for an IHS manufacturer specific product BIOS solution. This would make it easier for an ODM to use an IBV BIOS, but still be able to plug in the IHS manufacturer's functionality to provide to customers.

The systems and methods of this disclosure provide the personality module interface layers 148, 154 and/or 172 allow the IHS manufacturer to provide specific configuration information to an IBV or ODM without breaking or changing the "standard" UEFI framework interfaces. The new personality module layers (e.g., 146, 152 and/or 170) allow the IHS manufacturer to create new functionality and interfaces that the IHS manufacturer's BIOS group would have had to add to the framework. These separate and autonomous layer modules then provide the IHS manufacturer's unique services to the individual personality modules 146, 152 and/or 170 that are being included in the ODM or IBV UEFI BIOS.

Without the solution proposed in this disclosure, an IHS manufacturer may have to either propagate the framework changes to other IBVs (e.g., possibly through lengthy standards committee changes), or by providing the IHS manufacturer's framework changes to the IBV or ODM BIOS providers.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A personality module adaptor system including at least one computer-readable medium comprising instructions that include:
    a vendor basic input/output system (BIOS) framework including a vendor BIOS interface;
    a vendor module coupled to the BIOS framework and including a vendor module interface;
    a personality module interface layer coupled to the vendor BIOS and the vendor module; and
    a personality module coupled to the personality module interface layer and operable to provide a personality module functionality when used with a BIOS framework that is not the vendor BIOS framework;
    wherein the instructions on the at least one computer-readable medium that include the personality module interface layer comprise instructions that, when executed by a processor, cause the processor to provide translation between the personality module and each of the vendor module interface and the vendor BIOS interface such that the personality module provides the personality module functionality when used with the vendor BIOS framework.

2. The system of claim 1, wherein the personality module is a system management mode (SMM) module.

3. The system of claim 1, wherein the personality module is a driver execution environment (DXE) module.

4. The system of claim 1, wherein the personality module is a pre-EFI initialization (PEI) module.

5. The system of claim 1, wherein the personality module interface layer is included on a binary driver executable file.

6. The system of claim 1, wherein the vendor BIOS comprises a unified extensible firmware interface (UEFI) BIOS.

7. An information handling system (IHS) comprising:
    a processor;
    a computer-readable medium coupled with the processor;
    instructions on the computer-readable medium that are operable to provide a vendor basic input/output system (BIOS) framework that includes a vendor BIOS interface;
    instructions on the computer-readable medium that are operable to provide a vendor module that is coupled to the BIOS framework;
    instructions on the computer-readable medium that are operable to provide a personality module interface layer that is coupled to the vendor BIOS; and
    instructions on the computer-readable medium that are operable to provide a personality module that is coupled to the personality module interface layer and that is operable to provide a personality module functionality when used with a BIOS framework that is not the vendor BIOS framework;
    wherein the instructions on the at least one computer-readable medium that are operable to provide the personality module interface layer comprise instructions that, when executed by the processor, cause the processor to provide translation between the personality module and each of the vendor module and the vendor BIOS such that the personality module provides the personality module functionality when used with the vendor BIOS framework.

8. The IHS of claim 7, wherein the personality module is a system management mode (SMM) module.

9. The IHS of claim 7, wherein the personality module is a driver execution environment (DXE) module.

10. The IHS of claim 7, wherein the personality module is a pre-EFI initialization (PEI) module.

11. The IHS of claim 7, wherein the personality module interface layer is included on a binary driver executable file.

12. A method to adapt personality modules to a basic input-output system (BIOS), comprising:
    providing an information handling system (IHS) including at least one computer-readable medium comprising instructions that include a vendor basic input/output system (BIOS) framework, a vendor module coupled to the BIOS framework, a personality module interface layer coupled to the vendor BIOS and the vendor module, and a personality module coupled to the personality module interface layer, wherein the personality module is operable to provide a personality module functionality when used with a BIOS framework that is not the vendor BIOS framework;
    executing the instructions that include the personality module interface layer by a processor, wherein the execution of the instruction provides translation between the personality module and each of the vendor module and the vendor BIOS such that the personality module provides the personality module functionality when used with the vendor BIOS framework.

13. The method of claim 12, wherein the personality module is a system management mode (SMM) module.

14. The method of claim 12, wherein the personality module is a driver execution environment (DXE) module.

15. The method of claim 12, wherein the personality module is a pre-EFI initialization (PEI) module.

* * * * *